(12) United States Patent
Barnard et al.

(10) Patent No.: US 7,216,079 B1
(45) Date of Patent: May 8, 2007

(54) METHOD AND APPARATUS FOR DISCRIMINATIVE TRAINING OF ACOUSTIC MODELS OF A SPEECH RECOGNITION SYSTEM

(75) Inventors: Etienne Barnard, Pittsburgh, PA (US); Jean-Guy Dahan, Brookline, MA (US)

(73) Assignee: SpeechWorks International, Inc.

( * ) Notice: Subject to any disclaimer, the term of this patent is extended or adjusted under 35 U.S.C. 154(b) by 0 days.

(21) Appl. No.: 09/433,609

(22) Filed: Nov. 2, 1999

(51) Int. Cl.
 *G10L 15/06* (2006.01)
(52) U.S. Cl. .................................... 704/244
(58) Field of Classification Search ............... 704/236, 704/243, 244, 254
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 6,076,053 A | * | 6/2000 | Juang et al. | 704/236 |
| 6,076,057 A | * | 6/2000 | Narayanan et al. | 704/256 |
| 6,260,013 B1 | * | 7/2001 | Sejnoha | 704/240 |
| 6,272,462 B1 | * | 8/2001 | Nguyen et al. | 704/244 |

OTHER PUBLICATIONS

B. Juang et al., "Discriminative Learning for Minimum Error Classification," IEEE Transactions on Signal Processing 40:12 (Dec. 1992), at 3043.
Q. Huo et al., "A Study of On-Line Quasi-Bayes Adaptation for CDHMM-Based Speech Recognition," IEEE Trans. on Speech and Audio Processing, vol. 2, at 705 (1996).
A. Sankar et al., "An Experimental Study of Acoustic Adaptation Algorithms," IEEE Trans. on Speech and Audio Processing, vol. 2, at 713 (1996).
L. Bahl et al., "Discriminative Training of Gaussian Mixture Models for Large Vocabulary Speech Recognition Systems," IEEE Trans. on Speech and Audio Processing, vol. 2, at 613 (1996).

* cited by examiner

*Primary Examiner*—Angela Armstrong
(74) *Attorney, Agent, or Firm*—Bromberg & Sunstein LLP

(57) ABSTRACT

A method and apparatus are provided for automatically training or modifying one or more models of acoustic units in a speech recognition system. Acoustic models are modified based on information about a particular application with which the speech recognizer is used, including speech segment alignment data for at least one correct alignment and at least one wrong alignment. The correct alignment correctly represents a phrase that the speaker uttered. The wrong alignment represents a phrase that the speech recognition system recognized that is incorrect. The segment alignment data is compared by segment to identify competing segments and those that induced the recognition error. When an erroneous segment is identified, acoustic models of the phoneme in the correct alignment are modified by moving their mean values closer to the segment's acoustic features. Concurrently, acoustic models of the phoneme in the wrong alignment are modified by moving their mean values further from the acoustic features of the segment of the wrong alignment. As a result, the acoustic models will converge to more optimal values based on empirical utterance data representing recognition errors.

17 Claims, 5 Drawing Sheets

METHOD AND APPARATUS FOR DISCRIMINATIVE TRAINING OF ACOUSTIC MODELS OF A SPEECH RECOGNITION SYSTEM

FIELD OF THE INVENTION

The present invention relates generally to improving performance of automatic speech recognition systems, and relates more specifically to an improved discriminative training approach for acoustic models of a speech recognition system.

BACKGROUND OF THE INVENTION

Many automatic speech recognition systems use a pronunciation dictionary to identify particular words contained in received utterances. The term "utterance" is used herein to refer to one or more sounds generated either by humans or by machines. Examples of an utterance include, but are not limited to, a single sound, any two or more sounds, a single word or two or more words. In general, a pronunciation dictionary contains data that defines expected pronunciations of utterances. Each pronunciation comprises a set of phonemes. Each phoneme is defined using a plurality of acoustic models, each of which comprises values for various audio and speech characteristics that are associated with a phoneme.

When an utterance is received, the received utterance, or at least a portion of the received utterance, is compared to the expected pronunciations contained in the pronunciation dictionary. An utterance is recognized when the received utterance, or portion thereof, matches the expected pronunciation contained in the pronunciation dictionary. Recognition involves determining that phonemes identified in the utterance match acoustic models of corresponding phonemes of a particular vocabulary word, within predefined bounds of tolerance.

Often acoustic models are modified or "trained" based on actual received utterances in order to improve the ability of the speech recognizer to discriminate among different phonetic units. Although each acoustic model is associated with a particular phoneme, a dictionary based on such acoustic models may have several entries that sound similar or comprise similar sets of phonemes. These vocabulary words may be difficult for the speech recognizer to distinguish. Confusion among such words can cause errors in an application with which the speech recognizer is used.

One reason that such confusion can occur is that acoustic models are normally trained using generic training information, without reference to the context in which the speech recognizer or a related application is used. As a result, the speech recognizer lacks information that can be used to discriminate between phonemes or other phonetic units that may be particularly relevant to the specific task with which the speech recognizer is used.

For example, the English words AUSTIN and BOSTON sound similar and may be difficult for a speech recognizer to distinguish. If the speech recognizer is used in an airline ticket reservation system, and both AUSTIN and BOSTON are in the vocabulary, confusion of AUSTIN and BOSTON may lead to ticketing errors or user frustration.

As another example, consider the spoken numbers FIFTY and FIFTEEN. If the speech recognizer is used in a stock trading system, confusion of FIFTY and FIFTEEN may lead to erroneous orders or user frustration.

Examples of prior approaches that use generic modeling include, for example:

B. Juang et al., "Discriminative Learning for Minimum Error Classification," IEEE Transactions on Signal Processing 40:12 (December 1992), at 3043;

Q. Huo et al., "A Study of On-Line Quasi-Bayes Adaptation for CDHMM-Based Speech Recognition," IEEE Trans. on Speech and Audio Processing, vol. 2, at 705 (1996);

A. Sankar et al., "An Experimental Study of Acoustic Adaptation Algorithms," IEEE Trans. on Speech and Audio Processing, vol. 2, at 713 (1996);

L. Bahl et al., "Discriminative Training of Gaussian Mixture Models for Large Vocabulary Speech Recognition Systems," IEEE Trans. on Speech and Audio Processing, vol. 2, at 613 (1996).

The approaches outlined in these references, and other prior approaches, have significant drawbacks and disadvantages. For example, the prior approaches are applied only in the context of frame-based speech recognition systems that use hidden Markov models. None of the prior approaches will work with a segment-based speech recognition system. A fundamental assumption of those methods is that the same acoustic features are used to match every phrase in the recognizer's lexicon. In a segment-based system, the segmentation process produces a segment network where each hypothesis independently chooses an optimal path though that network. As a result, different hypotheses are scored against differing sequences of segment features, rather than all of them being scored relative to a common sequence of frame features.

In segment-based systems, alternate acoustic features, which are different from the primary features described above and again differ from one hypothesis to the next, are sometimes used. There is a need for an approach that enables discrimination between acoustic units of secondary features where the prior approaches still fail.

In addition, the prior approaches generally rely on manual human intervention to accomplish training or tuning. The prior approaches do not carry out discriminative training automatically based on utterances actually experienced by the system.

Based on the foregoing, there is a need for an automated approach for training an acoustic model based on information that relates to the specific application with which a speech recognition system is used.

There is a particular need for an approach for training an acoustic model in which a speech recognizer is trained to discriminate among phonetic units based on information about the particular application with which the speech recognizer is being used.

SUMMARY OF THE INVENTION

The foregoing needs, and other needs and objects that will become apparent from the following description, are achieved by the present invention, which comprises, in one aspect, a method for automatically training or modifying one or more acoustic models of words in a speech recognition system. Acoustic models are modified based on information about a particular application with which the speech recognizer is used, including speech segment alignment data for at least one correct alignment and at least one wrong alignment. The correct alignment correctly represents a phrase that the speaker uttered. The wrong alignment represents a phrase that the speech recognition system recognized that is incorrect. The segment alignment data is compared by segment to identify competing segments and those that induced recognition error.

When an erroneous segment is identified, acoustic models of the phoneme in the correct alignment are modified by moving their mean values closer to the segment's acoustic features. Concurrently, acoustic models of the phoneme in the wrong alignment are modified by moving their mean values further from the acoustic features of the segment of the wrong alignment. As a result, the acoustic models will converge to more optimal values based on empirical utterance data representing recognition errors.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus providing improved discriminative training of an acoustic model in an automatic speech recognition system is described.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

An approach for automatically training or modifying one or more acoustic models of words in a speech recognition system is described. In general, an acoustic model is modified based on information about a particular application or the context in which the speech recognizer is used. The application-specific information comprises speech segment alignment data for at least one correct alignment and at least one wrong alignment. The correct alignment represents a vocabulary word that correctly represents what the speaker uttered. The wrong alignment represents the vocabulary word that the speech recognition system recognized based on the speaker's utterance, but that incorrectly represents what the speaker uttered.

The segment alignment data is cross-compared, segment by segment, to identify competing segments that induced a recognition error. When an erroneous segment is identified, acoustic models of the phoneme in the correct alignment are modified by moving their mean values closer to the segment's acoustic features. Concurrently, acoustic models of the phoneme in the wrong alignment are modified by moving their mean values further from the acoustic features of the segment of the wrong alignment.

As a result, the acoustic models of a particular phoneme are gradually corrected according to empirical information derived from actual use of a particular speech recognition application. Consequently, performance of the speech recognizer for that application improves significantly over time though this self-correcting mechanism.

Further, rather than using generic acoustic models, the speech recognizer carries out recognition based on acoustic models that are tuned to the particular application then in use.

Figure 1:
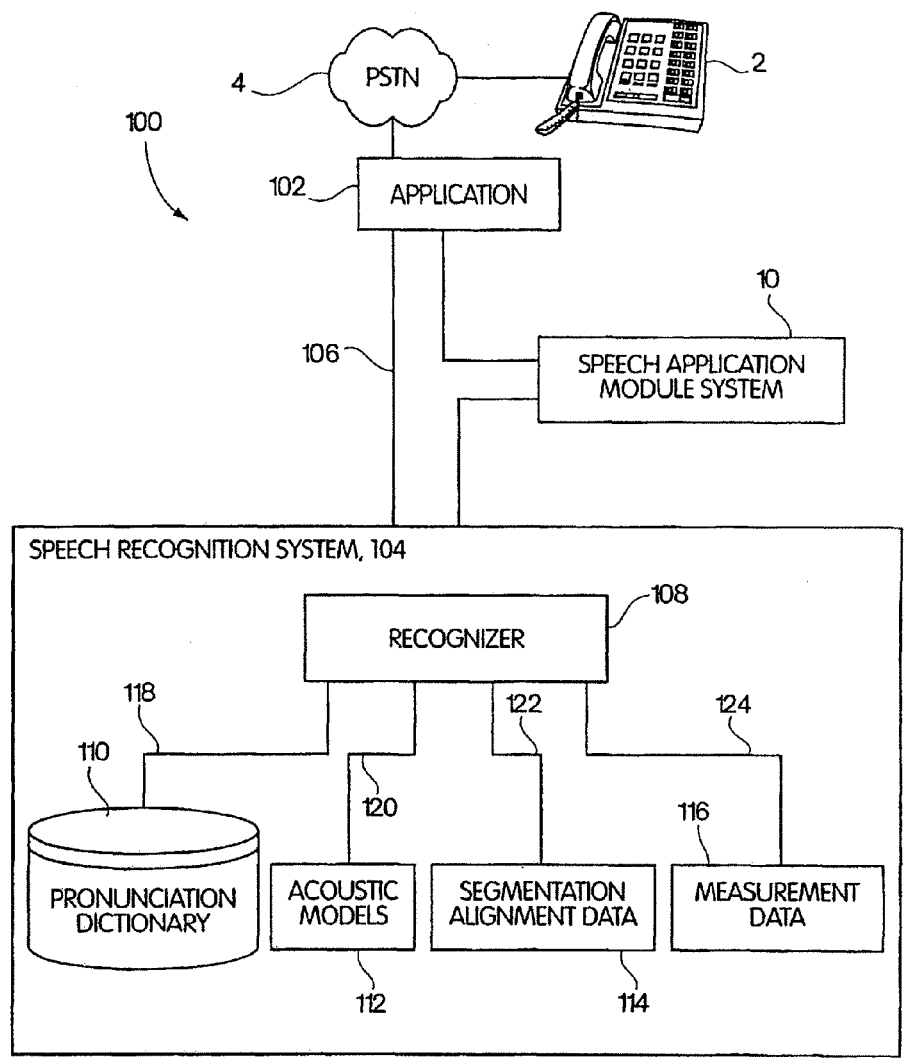
FIG. 1 illustrates a system used herein to describe various aspects and features of the invention.

FIG. 1 illustrates a speech application system 100 used herein to describe various aspects and features of the invention.

In one embodiment, a human speaker uses telephone 2 to place a telephone call through the public switched telephone network (PSTN) 4 to system 100. The call terminates at and is answered by application 102 that interacts with an automatic speech recognition (ASR) system 104. Alternatively, a speaker interacts directly with application 102 using an appropriate computer that executes the application.

Application 102 is any element that uses the speech recognition services of ASR 104. Examples of application 102 include, a voice-activated system or a telephone-based service, implemented in the form of one or more computer programs or processes, for creating airline flight reservations, delivering stock quotations, providing corporate information, etc. Application 102 is coupled to ASR 104 and communicates with it using a link 106.

In one embodiment, application 102 interacts with one or more speech application modules 10 in the course of processing received utterances and determining logical steps to take in furtherance of the functions of the application. Speech application modules 10 comprise one or more software elements that implement pre-defined high-level speech processes. For example, application 102 can call speech application modules 10 to generate and interpret a YES/NO query to the speaker. A commercial product that is suitable for use as speech application modules 10 is DialogModules™, commercially available from Speechworks International, Inc., Boston, Mass.

ASR 104 includes an automatic speech recognizer ("recognizer") 108, a pronunciation dictionary 110, acoustic models 112, segmentation alignment data 114, and measurement data 116. Recognizer 108 is communicatively coupled to these elements, respectively, by links 118, 120, 122, 124. Links 118, 120, 122, 124 may be implemented using any mechanism to provide for the exchange of data between their respective connected entities. Examples of links 118, 120, 122, 124 include network connections, wires, fiber-optic links and wireless communications links, etc.

Non-volatile storage may used to store the pronunciation dictionary, acoustic models, and measurement data. The non-volatile storage may be, for example, one or more disks. Typically the pronunciation dictionary, acoustic models, and segmentation alignment data are stored in volatile memory during operation of recognizer 108.

Recognizer 108 is a mechanism that is configured to recognize utterances of a speaker using pronunciation dictionary 110. The utterances are received in the form of data provided from application 102 using link 106. Recognizer 108 may also require interaction with other components in ASR 104 that are not illustrated or described herein so as to avoid obscuring the various features and aspects of the invention. Preferably, recognizer 108 provides speaker-independent, continuous speech recognition. A commercial product suitable for use as recognizer 108 is the Core Recognizer of SpeechWorks™ 5.0, commercially available from Speechworks International, Inc.

Pronunciation dictionary 110 contains data that defines expected pronunciations for utterances that can be recognized by ASR 104. An example of pronunciation dictionary 110 is described in more detail in co-pending application Ser. No. 09/344,164, filed Jun. 24, 1999, entitled "Automatically Determining The Accuracy Of A Pronunciation Dictionary In A Speech Recognition System," and naming Etienne Barnard as inventor, the entire contents of which is hereby incorporated by reference as if fully set forth herein.

Segmentation alignment data 114 is created and stored by recognizer 108 for each utterance that it receives from application 102. The segment alignment data represents boundaries of discrete acoustic segments within a complete utterance of a speaker. The segment alignment data is used to determine which acoustic segments correspond to silence or to one or more phonemes. For each received utterance, recognizer 108 creates and stores a plurality of alignments as part of segmentation alignment data 114. Each alignment represents a hypothesis of a correct segmentation of the utterance.

Acoustic models 112 store data that defines a plurality of acoustic characteristics for each of a plurality of phonemes that make up words. Typically, a plurality of pre-defined acoustic models 112 are stored in non-volatile storage, loaded at run time of recognizer 108, and used for reference in determining how to recognize phonemes and words. Further, recognizer 108 creates and stores acoustic models for each speech segment that it recognizes in a received utterance, in real time as utterances are received and processed.

According to an embodiment, pronunciation diagnostic tool 114 is configured to automatically determine the accuracy of pronunciation dictionary 110 and identify particular expected pronunciations that do not satisfy specified accuracy criteria. The expected pronunciations that do not satisfy the specified accuracy criteria may then be updated to more accurately reflect the actual pronunciations of received utterances.

ASR 104 may include other components not illustrated and described herein to avoid obscuring the various aspects and features of the invention. For example, ASR 104 may include various software development tools and application testing tools available to aid in the development process. One such tool is a commercially-available package of reusable speech software modules known as DialogModules™, provided by Speechworks International, Inc. of Boston, Mass.

Discriminative Training

A discriminative training mechanism useful in the foregoing system is now described. In the preferred embodiment, acoustic models 112 are modified and stored ("trained") based on information specific to a particular application 102. In particular, training is enhanced by training on examples of words that are commonly confused by recognizer 108 when it is used with application 102.

In prior approaches, acoustic models usually are trained using the maximum likelihood technique. Broadly, the maximum likelihood technique involves receiving all available samples of pronunciations of a particular phoneme, e.g., "a" (long "a") and computing the mean and variance of a plurality of acoustic parameters associated with that phoneme. The system then independently carries out similar processing for another phoneme, e.g., "ah." When recognizer 108 needs to discriminate between "a" and "ah," it compares acoustic models of a phoneme of a current hypothesized alignment to the acoustic models of utterances that have been processed in the past. A drawback of this approach is that each phoneme is modeled independently without regard to discriminating its acoustic models from those of a similar sounding phoneme.

In a preferred embodiment, rather than calculate phoneme acoustic models independently, acoustic models of similar sounding or related phonemes are calculated together. For example, a preferred process considers acoustic models of "a" phonemes that were actually confused by the recognizer 108 with acoustic models of "ah" phonemes. The converse is also considered. In response, the process modifies the acoustic models based on the confusion that was experienced.

Specifically, each utterance that is received by the application is broken into a plurality of phonemes using forced segment alignment techniques, resulting in a "current alignment" of the utterance. The process also receives, from the recognizer, segmentation alignment data representing at least one correctly recognized sequence of phonemes ("correct alignment"), and segmentation alignment data representing at least one incorrectly recognized sequence of phonemes ("wrong alignment"). The process determines, for every phoneme in the correct alignment, the closest corresponding phoneme ("competing phoneme") in the wrong alignment. For each pair of correct and wrong competing phonemes, mean values within the acoustic models are modified by shifting the mean values of the wrong phoneme away from the acoustic feature vector used to score it. Further, mean values of the acoustic models of the correct phoneme are shifted toward the acoustic feature used to score it. In one embodiment, only the closest correct mean value and the closest wrong mean value are moved.

The process is repeated over many utterances that are received during use of application 102. As a result, the acoustic models gradually converge on values that represent improved values given the context of the current application 102. Advantageously, such training that is based in part on wrong example utterances helps improve discrimination and accuracy.

The process can be carried out offline, when application 102 is shut down and not processing live calls, or online. For example, online processing can be done while application 102 is executing, but after a particular call terminates, based on recognition errors that were detected during that call. This enables the system to modify its performance based upon context information of each a particular call, such as user confirmation responses.

Figure 2A:
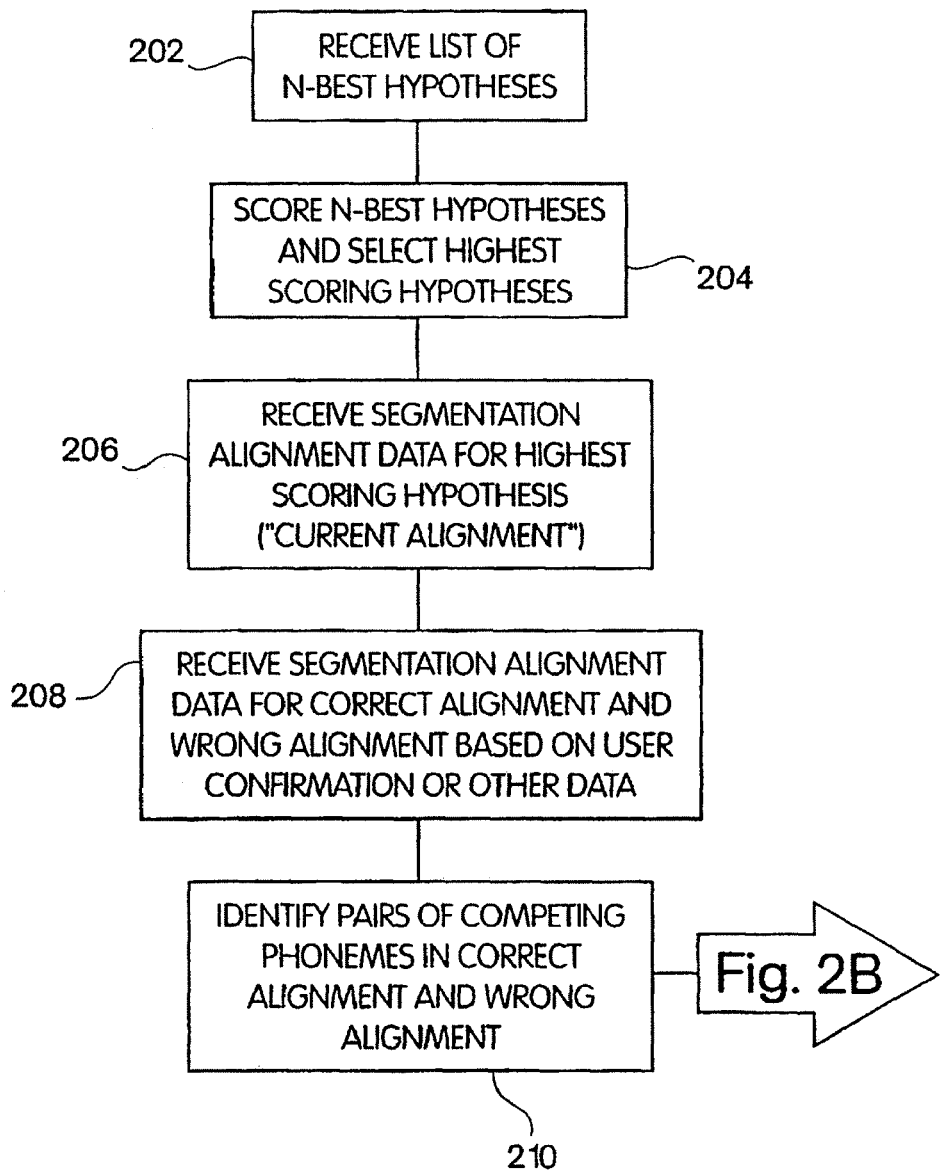
FIG. 2A is a flow diagram of a process of discriminative training.

FIG. 2A is a flow diagram of a process of discriminative training. FIG. 2A assumes that prior to carrying out steps of the first block of FIG. 2A (block 202), a speaker has initiated a connection to a speech recognition application, the application has executed, and automatic speech recognition system associated with the application has received, digitally encoded and stored at least one utterance of the speaker.

In block 202, a list of n-best hypotheses is received. Each of the n-best hypotheses is a plurality of phonemes that represent a possible recognition of a word in the utterance. For example, recognizer 108 generates a list of n-best hypotheses of phonemes based on current acoustic models 112.

In block 204, the hypotheses in the n-best list are scored, and the best one is selected. Scoring involves assigning a value to each hypothesis based on how well the hypothesis matches the digitized speech data that was received. For example, scoring may involve comparing each phoneme to the acoustic models 112 and computing a variance value for each acoustic model. The variance value is the distance of the mean of an acoustic model of the current phoneme from the mean of one of the pre-defined acoustic models 112. The sum of the variance values for all phonemes in a hypothesis is the score of that hypothesis. Alternative known scoring techniques may be used.

In block 206, segmentation data is received for the highest scoring hypothesis in the n-best list. Typically, segmentation information for each hypothesis is automatically generated and stored by the speech recognizer. Segmentation involves dividing a stream of digitized data that represents an utterance into segments, in which each segment represents a discrete sound. Preferably, segmentation is carried out using a forced alignment process. Details of one example segmentation process disclosed in co-pending application Ser. No. [NUMBER], entitled Segmentation Approach For Speech Recognition Systems, and naming as inventors Mark Fanty and Michael Phillips, the entire contents of which are hereby incorporated by reference as if fully set forth herein.

In block 208, segmentation data is received for a correct alignment and a wrong alignment based on user confirmation or other data. Specifically, assume that application 102 receives an utterance by a speaker of the word "AUSTIN." Application 102 passes speech data representing the word to recognizer 108. Recognizer 108 wrongly recognizes the word as "BOSTON," but also returns a low confidence value to application 102, indicating that recognizer 108 is not confident that recognition of "BOSTON" is correct. In response, application 102 generates a prompt to the speaker, "Did you say BOSTON?" The speaker responds by uttering "NO," which is correctly recognized. In response, application 102 prompts the speaker, "Did you say AUSTIN?" and the speaker responds "YES." Therefore, application 102 stores information indicating that AUSTIN is the correct word but that user confirmation was required to accomplish recognition. The stored information may comprise a user confirmation flag, or equivalent data. In block 208, the process receives segmentation alignment data for both the wrong hypothesis of BOSTON and a correct hypothesis of AUSTIN.

The foregoing steps may be assisted, in certain embodiments, by functionality implemented in speech application modules 10.

Figure 2B:
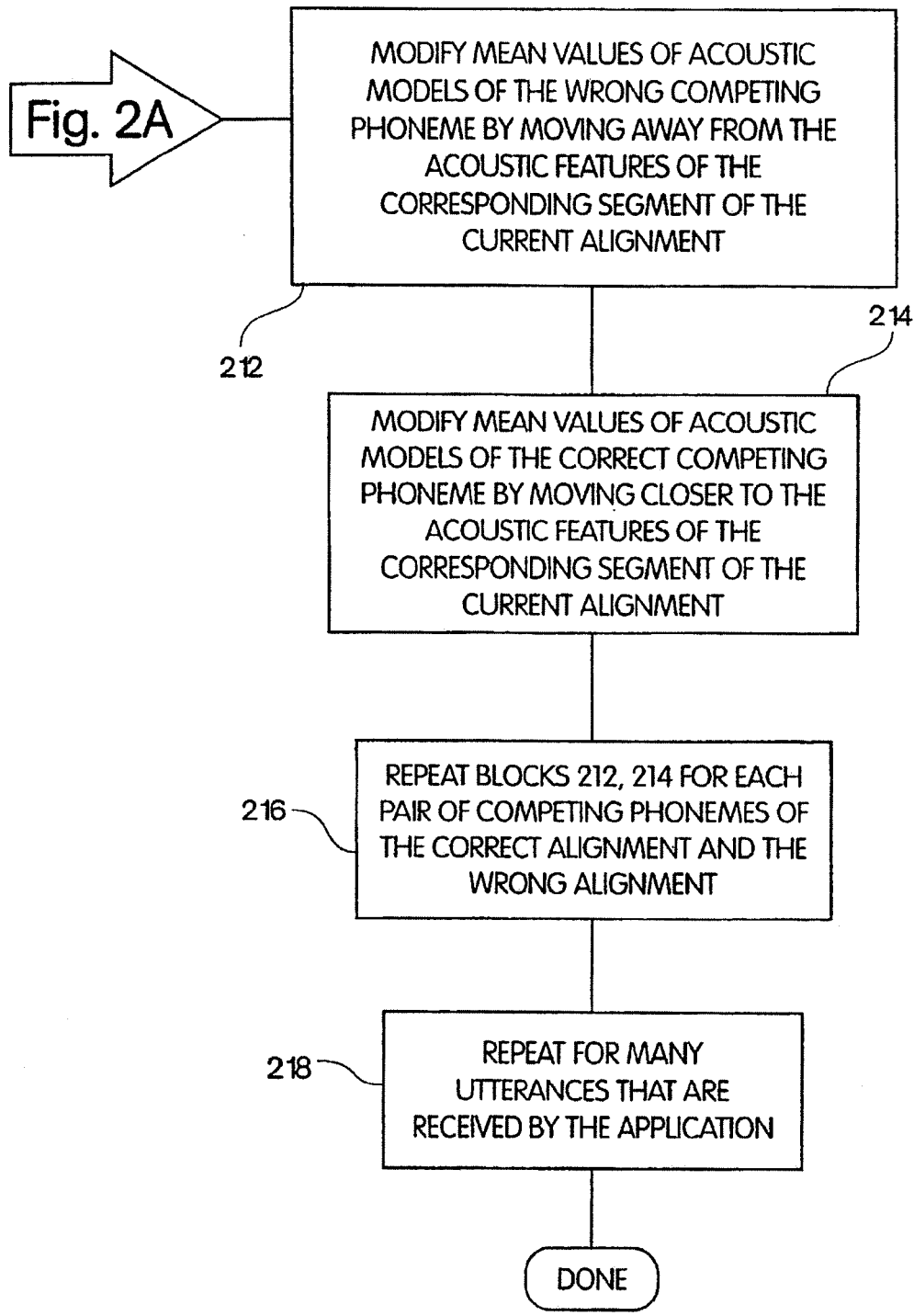
FIG. 2B is a flow diagram of further steps in the process of FIG. 2A.
Figure 3:
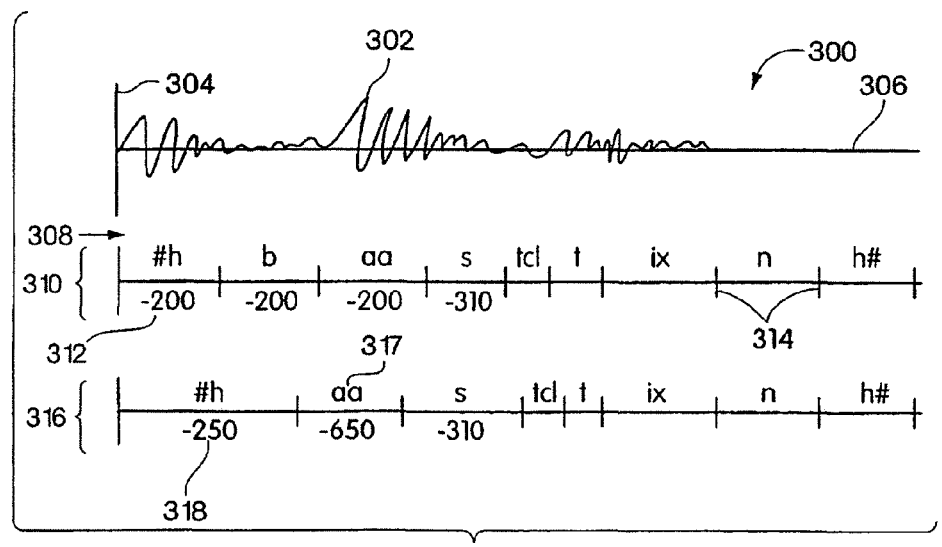
FIG. 3 is a diagram of an example utterance and example segmentation alignments that may be generated by the speech recognizer using a segmentation process and received by the process of FIG. 2A, FIG. 2B.

FIG. 3 is a diagram of an example utterance and example segmentation alignments that may be generated by the speech recognizer using a segmentation process and received by the process of FIG. 2 at block 206 and block 208.

FIG. 3 includes a waveform diagram 300 that shows an utterance waveform 302, a first alignment 310, and a second alignment 316. The schematic depiction of these elements is provided for clarity. In practice, the utterance waveform and alignments are implemented in the form of digital data that is stored in computer memory. Also, there may be any number of alignments, and two are shown only as an example illustration.

Waveform 302 is a graphic representation of a spoken utterance in which vertical axis 304 represents amplitude and horizontal axis 306 represents time.

First alignment 310 comprises a horizontal line divided by segment boundaries 314 that are illustrated using hatch marks. Segments fall between segment boundaries and are associated with portions of waveform 302. Each segment is associated with a phoneme score value 312 and a phoneme 308. Similarly, second alignment 316 comprises a plurality of segments, each associated with second phonemes 317 and second phoneme score values 318.

For example purposes, first alignment 310 represents an n-best hypothesis of BOSTON, and second alignment 316 represents a hypothesis of AUSTIN. Thus, first alignment 310 is divided into segments representing phonemes 308 of #h, b, aa, s, t-closure, t, ix, n, h#. In combination, these phonemes represent a typical pronunciation of "BOSTON." The phoneme #h is a boundary segment that indicates silence, and is the hypothesized start of a phrase. The phoneme h# similarly is the hypothesized silence at the end of a phrase. Second alignment comprises phonemes 317 of #h, aa, s, t-closure, t, ix, n, h#. In the second alignment, some of the energy attributed to the phoneme "b" in the first alignment is attributed to the phoneme "aa." Further, a leading portion of the energy attributed to the phoneme "b" in the first alignment is hypothesized as silence in the second alignment.

As described above in connection with block 208 of FIG. 2A, when this segmentation data is received, the SRS also has available additional information useful in discrimination. For example, the SRS may know that after speaking the utterance represented by waveform 302, the SRS requested the speaker to confirm the utterance as "BOSTON" and the speaker said "YES." In a system that uses DialogModules, such confirmation information is automatically created and stored.

Alternatively, the SRS may know that the utterance was initially recognized as BOSTON but that such recognition was erroneous and the correct utterance was AUSTIN. Assume that this occurs, such that first alignment 310 is known to be a wrong alignment whereas second alignment 316 is known to be correct. Assume further that the SRS assigned a hypothesis score value of "−2000" to first alignment 310 and a worse score value of "−2200" to second alignment 316. In other words, assume that the hypothesis score values incorrectly indicate which alignment that is correct.

Each hypothesis score value is the sum of all segment score values 312, 318 in a particular alignment. Each segment score value represents the variance of a particular phoneme from the mean value of that phoneme as represented in acoustic models 112. The segment score values may be created and stored by comparing a segment to all the pre-defined phoneme values, selecting the closest pre-defined value, and computing the variance from mean.

Referring again to FIG. 2A, in block 210, the process identifies pairs of competing phonemes in the correct alignment and the wrong alignment to determine the most likely location of an error. For example, the process examines the segment score values 312, 318 of first alignment 310 and second alignment 316, respectively. A segment by segment comparison is carried out. For each segment, all competing segments are identified. Then, the process identifies those segments in the incorrect alignment that do not match a competing segment of the correct alignment.

Segments and corresponding competing segments may be represented or stored in the form of pairs of tags. For example, the notation $(S_{1C}, S_{1W})$ indicates that segment 1 of the correct alignment corresponds to segment 1 of the wrong alignment. Referring again to FIG. 3, a vertical comparison of the segments of the correct alignment 316 to segments of wrong alignment 310 indicates the following. First, segment 1 of the correct alignment 316 (the "h#") segment overlaps with segment 1 of the wrong alignment 310 ("h#). Second, segment 1 of the correct alignment 316 ("h#") also overlaps with segment 2 of the wrong alignment 310 ("b"). Third, the second segment of the correct alignment 316 ("aa") overlaps with segment 2 of the wrong alignment 310 ("b"). Fourth, the second segment of the correct alignment 316 ("aa") overlaps with segment 3 of the wrong alignment 310 (" aa"). The foregoing information may be expressed as: $(S_{1C}, S_{1W})$, $(S_{1C}, S_{2W})$, $(S_{2C}, S_{2W})$, $(S_{2C}, S_{3W})$.

The process then compares the segment score values for each segment of each pair and determines whether the segment score value of the segment of the correct alignment is higher than the segment score value of the wrong alignment. For example, the segment score values of $(S_{1C}, S_{1W})$ are compared. If the segment score value of $S_{1C}$ is greater than that of $S_{1W}$, corrective action is needed. In one embodiment, corrective action is taken only when the difference of the score values is less than a pre-determined threshold. An example threshold value is 60 points. Use of a threshold value recognizes that a difference in score value of greater than the threshold value represents adequate discrimination that does not need to be improved, whereas a difference of less than the threshold indicates inadequate discrimination that needs improvement, otherwise recognition errors may occur.

In another embodiment, if the correct competing phoneme scored more than 500 points worse than the wrong competing phoneme, then the recognition is deemed so bad, no improvement is attempted and no corrective action is taken. This response recognizes that in such cases, the n-best hypotheses that have been selected may be invalid. Accordingly, rather than attempting improvement based on bad data, it is more appropriate to apply corrective action only when the system is confident such action was suitable.

When a pair of segments that fall within the threshold values is identified, the process examines acoustic models that are associated with the segments and attempts to determine which portion of the acoustic model is responsible for the error. Parameter values associated with the acoustic model are modified in order to cause the acoustic model to result in a segment score that is closer to the correct value and further from the erroneous value. Movement is made either directly towards or away from the measurements depending on whether the process is correcting the wrong or the right one.

As shown in block 212 of FIG. 2B, the process modifies mean values of acoustic models of the wrong competing phoneme by moving such values away from the feature vector against which it was scored. Similarly, in block 214, the process modifies mean values of acoustic models of the correct competing phoneme by moving them closer to the feature vector against which that one was scored.

In an embodiment, the modification comprises subtracting the mean of the model that results from recognition of a phoneme from the feature vector against which it was scored. Preferably, the amount of movement is approximately 2% of this difference. Other implementations may move the models by a greater or lesser amount. The amount of movement may be implemented as a pre-defined constant value. The amount of movement is also termed the "learning rate." A relatively small value is preferred for use in conjunction with a large number of utterances, for example, hundreds of utterances. Using this process, the cumulative effect is a gradual but highly accurate correction in discrimination. The process also results in smoothing over large but infrequent errors.

Figure 4:
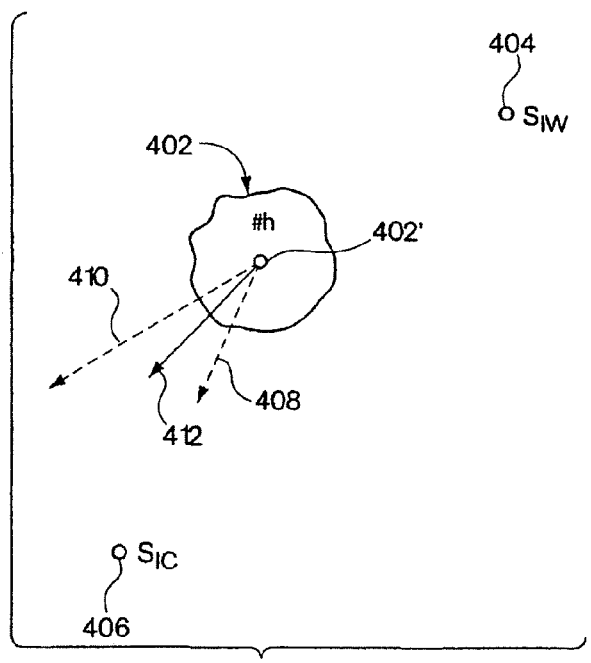
FIG. 4 is a diagram that illustrates movement of an exemplary acoustic model using the foregoing technique.

FIG. 4 is a diagram that illustrates movement of an exemplary acoustic model using the foregoing technique.

As an example, FIG. 4 depicts structures associated with two segments $(S_{1C}, S_{1W})$. Acoustic model 402 represents "#h" and has a mean score value represented by point 402'. Correct segment score value $S_{1C}$ is represented by point 406 and wrong score value $S_{1W}$ is represented by point 404. To improve discrimination of the #h phoneme, acoustic model 402 will be moved closer to point 406, as indicated by vector 408, and further from point 404, as indicated by vector 410. As a result, the net displacement of acoustic model 402 will be as indicated by vector 412.

As a result, the next time the same phoneme is encountered, the score value of the correct segment $S_{1C}$ will improve, because the distance of point 402 to point 406 is shorter, and therefore the variance from mean value will be less. Conversely, the score value of the wrong segment $S_{1W}$ will be less because the distance of point 402 to point 404 is greater, and therefore the variance from mean value is greater. This improvement may result in correct recognition resulting from the improved discriminative training of the acoustic model.

FIG. 4 presents the foregoing technique in graphical illustrative form, however, in practice, each acoustic model comprises a mixture of preferably 32 Gaussian components according to the relation $$N(x, m, \theta) = \sum_{n=1}^{N} w_n \sum_{i=1} e^{-\frac{(x-m_i)^2}{\sigma_i^2}} \frac{1}{\sqrt{2}\pi\sigma_i}$$

wherein each Gaussian component is defined according to the relation $$\frac{1}{\sqrt{2\pi\sigma}}\left(e^{-\frac{(x-m)^2}{\sigma^2}}\right)$$

This relation may be conceptualized as a quasi-bell curve in which the height of the curve is the mean and the width of the center portion of the curve is the variance. Preferably, the 32 Gaussian components are placed in multi-dimensional space, associated with many different measurements. The 8 components model a particular phoneme in a variety of contexts involving noise and other factors. In an embodiment, the modifications described above in connection with FIG. 4 are carried out with respect to all measurements. The segment score values are based on all measurements.

Referring again to FIG. 2B, in block 216, the process repeats blocks 212, 214 for each pair of competing phonemes of the correct alignment and the wrong alignment until all competing pairs are considered. In the example of FIG. 3, there are four (4) competing pairs as identified above. The remaining phonemes ("s", t-closure, "t", "ix", "n", h#) correspond to one another and are not competing for selection as correct phonemes. Thus, acoustic models of the remaining phonemes would not be modified.

In block 218, the entire process is repeated for many utterances that are received by the application. This ensures that correction is based upon an adequate amount of data.

It will be apparent from the foregoing description that the process disclosed herein has numerous advantages over prior approaches. These include at least the following:

1. Corrections are carried out based upon actual occurrences in a dialog between a speaker and a speech recognition system. Thus, corrections are based upon information or assumptions about errors that occurred in actual use of an automatic speech recognizer rather than based upon human intervention. Such corrections are carried out automatically and can be carried out during online processing of a speech recognition application by the speech recognizer.

2. The process of discriminative training is applied for the first time to a segment-based speech recognition system. Prior approaches have operated only in frame-based systems based on hidden Markov models. The prior approaches have not involved identification of competing segments or processing errors based on identification of segments.

Hardware Overview

Figure 5:
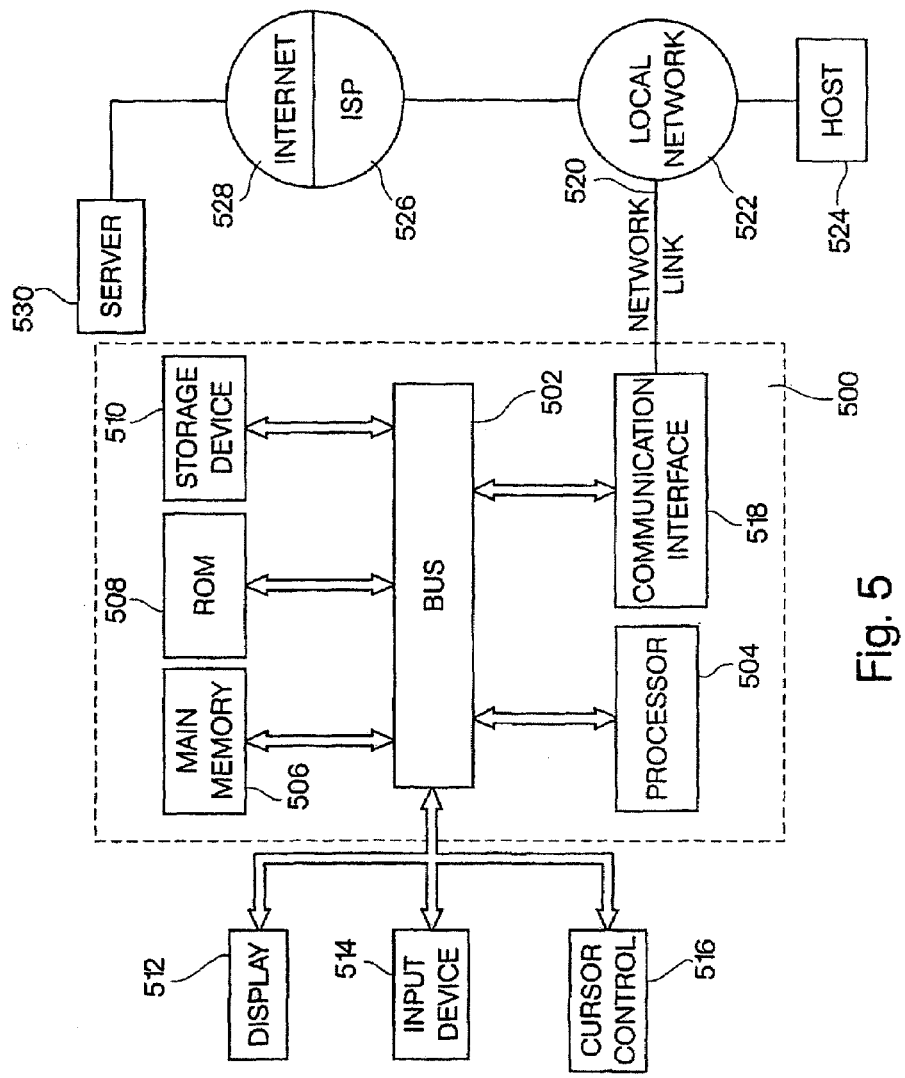
FIG. 5 is a block diagram of a computer system with which embodiments may be used.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for carrying out a process of discriminative training. According to one embodiment of the invention, a process of discriminative training is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for a process of discriminative training as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of unsupervised training of acoustic models of a segmentation-based automatic speech recognition system, comprising:

receiving correct segment-based alignment data that represents a correct alignment of a first sequence of utterance features received by the speech recognition system;

receiving incorrect segment-based alignment data that represents an incorrect alignment of a second sequence of utterance features received by the speech recognition system;

identifying a first phoneme in the correct alignment data that corresponds to a second phoneme in the incorrect alignment data; and modifying a first acoustic model of the first phoneme by moving at least one mean value thereof closer to corresponding feature values in the first sequence of utterance features.

2. A method as recited in claim 1, further comprising: modifying a second acoustic model of the second phoneme by moving at least one mean value thereof farther from corresponding feature values in the second sequence of utterance features.

3. A method as recited in claim 2, further comprising: iteratively repeating the identifying and modifying steps for all phonemes in the wrong alignment data that correspond to one or more phonemes in the correct alignment data.

4. A method as recited in claim 2, wherein modifying the second acoustic model includes modifying a set of model components associated with the second phoneme by moving each mean value thereof farther from the corresponding feature values in the second sequence of utterance features.

5. A method as recited in claim 1, wherein the correct alignment data is known to be correct based on user confirmation information received from the speech recognition system.

6. A method as recited in claim 1, further comprising: iteratively repeating the identifying and modifying steps for all phonemes in the correct alignment data that correspond to one or more phonemes in the wrong alignment data.

7. A method as recited in claim 1, wherein the correct alignment data includes data that represents a segment alignment of a less than highest scoring hypothesis from among n-best hypotheses of an utterance received by the speech recognition system.

8. A method as recited in claim 1, wherein moving at least one mean value closer to corresponding feature values in the first sequence of utterance features includes subtracting a multiple of the corresponding feature values from the at least one mean value.

9. A method as recited in claim 1, wherein the moving at least one mean value closer to corresponding feature values in the first sequence of utterance features includes modifying the at least one mean value by approximately 2%.

10. A method as recited in claim 1, wherein modifying a first acoustic model includes modifying a set of model components associated with the first phoneme by moving each mean value thereof closer to the corresponding feature values in the first sequence of utterance features.

11. A method as recited in claim 1, wherein the incorrect alignment data is known to be incorrect based on user confirmation information received from the speech recognition system.

12. A method of improving performance of a segmentation-based automatic speech recognition system (ASR) comprising:

receiving a correct segment-based alignment of a first sequence of utterance features received by the ASR;

receiving an incorrect segment-based alignment of a second sequence of utterance features received by the ASR in the context of a particular application using the ASR;

identifying a first phoneme in the correct segment-based alignment that corresponds to a second phoneme in the incorrect segment-based alignment;

modifying a first acoustic model of the first phoneme by moving at least one mean value thereof closer to corresponding feature values in the first sequence of utterance features.

13. A method as recited in claim 12, further comprising: modifying a second acoustic model of the second phoneme by moving at least one mean value thereof farther from corresponding feature values in the second sequence of utterance features.

14. A computer-readable medium carrying one or more sequences of instructions for training acoustic models of a segmentation-based automatic speech recognition system, wherein execution of the one or more sequences of instructions by one or more processors causes the one or more processors to perform the steps of:

receiving correct segment-based alignment data that represents a correct alignment of a first sequence of utterance features received by the speech recognition system;

receiving incorrect segment-based alignment data that represents an incorrect alignment of a second sequence of utterance features received by the speech recognition system;

identifying a first phoneme in the correct alignment data that corresponds to a second phoneme in the incorrect alignment data; and modifying a first acoustic model of the first phoneme by moving at least one mean value thereof closer to corresponding feature values in the first sequence of utterance features.

15. A computer-readable medium as recited in claim 14, wherein the instructions further comprise instructions for carrying out the steps of:

modifying a second acoustic model of the second phoneme by moving at least one mean value thereof farther from corresponding feature values in the second sequence of utterance features.

16. A segmentation-based automatic speech recognition system comprising:

a speech recognizer that includes one or more processors;

non-volatile storage coupled to the speech recognizer and comprising a plurality of segmentation alignment data and a plurality of acoustic models;

a computer-readable medium coupled to the speech recognizer and carrying one or more sequences of instructions for training acoustic models, wherein execution of the one or more sequences of instructions by the one or more processors causes the one or more processors to perform the steps of:

receiving correct segment-based alignment data that represents a correct segment alignment of a first sequence of utterance features received by the speech recognition system;

receiving incorrect segment-based alignment data that represents an incorrect alignment of a second sequence of utterance features received by the speech recognition system;

identifying a first phoneme in the correct alignment data that corresponds to a second phoneme in the incorrect alignment data; and modifying a first acoustic model of the first phoneme by moving at least one mean value thereof closer to corresponding feature values in the first sequence of utterance features.

17. A speech recognition system as recited in claim 16, wherein the instructions further comprise instructions for carrying out the steps of:

modifying a second acoustic model of the second phoneme by moving at least one mean value thereof farther from corresponding feature values in the second sequence of utterance features.

* * * * *